US008834015B2

(12) United States Patent
White et al.

(10) Patent No.: US 8,834,015 B2
(45) Date of Patent: Sep. 16, 2014

(54) BLENDER WITH CO-OPERATING JUG AND BLADES

(75) Inventors: Gerard Andrew White, Botany (AU); David Davenport, Botany (AU)

(73) Assignee: Breville Pty Limited, Botany, New South Wales ( * ) Notice: Subject to any disclaimer, the term of this patent is extended or adjusted under 35 U.S.C. 154(b) by 988 days.

(21) Appl. No.: 12/065,723

(22) PCT Filed: Sep. 5, 2006

(86) PCT No.: PCT/AU2006/001297
§ 371 (c)(1),
(2), (4) Date: Jul. 17, 2008

(87) PCT Pub. No.: WO2007/028198
PCT Pub. Date: Mar. 15, 2007

(65) Prior Publication Data
US 2009/0114616 A1    May 7, 2009

(30) Foreign Application Priority Data
Sep. 5, 2005    (AU) ................................ 2005904850

(51) Int. Cl.
*B01F 7/00*    (2006.01)
*A47J 43/046*    (2006.01)
*A47J 43/07*    (2006.01)

(52) U.S. Cl.
CPC ............ *A47J 43/046* (2013.01); *A47J 43/0722* (2013.01)
USPC ........ 366/330.3; 366/206; 366/343; 366/314; 366/307; 241/282.2; 241/293

(58) Field of Classification Search
USPC ........... 366/205–206, 279, 343, 330.1–330.3, 366/293, 314; 241/282.1–282.2
See application file for complete search history.

(56) References Cited

U.S. PATENT DOCUMENTS

| | | | | |
|---|---|---|---|---|
| 2,702,571 A * | 2/1955 | Murray | ......................... | 241/294 |
| 2,940,738 A * | 6/1960 | Posener et al. | ................ | 366/205 |
| 4,200,240 A * | 4/1980 | Machuron | ..................... | 241/37.5 |
| 4,890,758 A * | 1/1990 | Gailus | ........................... | 220/270 |
| 5,716,132 A * | 2/1998 | Chou | ............................ | 366/129 |
| 5,762,417 A * | 6/1998 | Essen et al. | ................... | 366/264 |
| 6,092,922 A * | 7/2000 | Kett et al. | ..................... | 366/205 |
| 6,334,705 B1 * | 1/2002 | Weetman | ................... | 366/330.1 |
| 6,532,863 B1 | 3/2003 | Lee | | |
| 6,616,324 B1 * | 9/2003 | Planca et al. | .................. | 366/205 |
| 6,666,574 B1 | 12/2003 | Pryor | | |
| 6,758,592 B2 * | 7/2004 | Wulf et al. | ..................... | 366/205 |
| 6,811,303 B2 * | 11/2004 | Dickson, Jr. | .................. | 366/206 |

(Continued)

FOREIGN PATENT DOCUMENTS

BE    858-573 A    3/1978
DE    4414822 A1    11/1995
(Continued)

*Primary Examiner* — Joseph S Del Sole
*Assistant Examiner* — Nahida Sultana
(74) *Attorney, Agent, or Firm* — Molins & Co Pty Ltd

(57) ABSTRACT

A blender comprises a jug and a cutting assembly having an upwardly inclined main blade portion. The jug has an interior portion, and the lower portion has a profile that includes an upwardly reaching portion conforms to the blade shape of the cutting assembly to reduce food accumulation below the main blades.

20 Claims, 20 Drawing Sheets

(56) References Cited

U.S. PATENT DOCUMENTS

| | | | |
|---|---|---|---|
| 6,854,876 | B2 | 2/2005 | Dickson |
| 7,004,414 | B2 * | 2/2006 | Chen .................... 241/292.1 |
| 7,481,573 | B2 * | 1/2009 | Gigas et al. ............. 366/330.1 |
| 8,220,986 | B2 * | 7/2012 | Janz et al. .............. 366/330.3 |
| 2002/0139884 | A1 | 10/2002 | Williams et al. |
| 2003/0070566 | A1 * | 4/2003 | Areh et al. .................. 99/495 |
| 2006/0176768 | A1 * | 8/2006 | Williams et al. ............ 366/205 |
| 2006/0209627 | A1 * | 9/2006 | McGill ........................ 366/205 |
| 2007/0253283 | A1 * | 11/2007 | Dickson, Jr. ............... 366/205 |
| 2008/0057168 | A1 * | 3/2008 | McGill ........................ 426/393 |
| 2008/0212405 | A1 * | 9/2008 | Globerman et al. ........ 366/288 |
| 2008/0264270 | A1 * | 10/2008 | Peng ............................ 99/331 |
| 2009/0084275 | A1 * | 4/2009 | Liang ........................... 99/513 |
| 2009/0114616 | A1 * | 5/2009 | White et al. ................ 215/307 |
| 2009/0260236 | A1 * | 10/2009 | Lin ............................... 30/265 |
| 2011/0149677 | A1 * | 6/2011 | Davis et al. ................. 366/205 |
| 2012/0026826 | A1 * | 2/2012 | Broadbent .................. 366/192 |
| 2013/0240654 | A1 * | 9/2013 | Rukavina ................... 241/282.1 |

FOREIGN PATENT DOCUMENTS

| | | | |
|---|---|---|---|
| DE | 4220234 | A1 | 12/2011 |
| FR | 2758451 | A1 | 7/1998 |
| JP | 10117944 | | 5/1998 |
| JP | 2002282139 | A | 10/2002 |
| WO | WO00/13563 | A1 | 3/2000 |
| WO | WO02/13622 | A2 | 2/2002 |
| WO | WO02/38011 | A2 | 5/2002 |
| WO | WO2005013787 | A1 * | 2/2005 ............ A47J 43/042 |

* cited by examiner

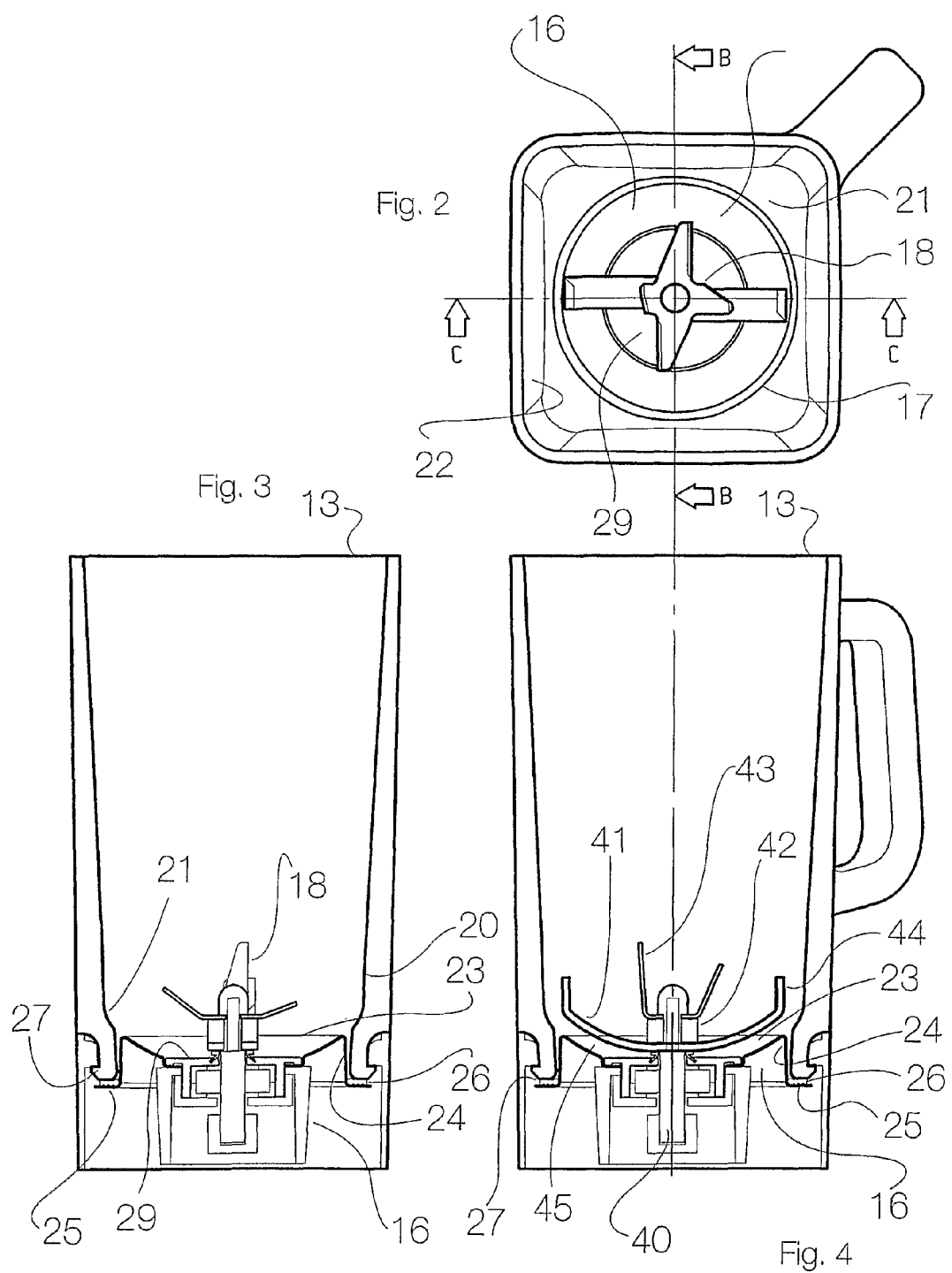

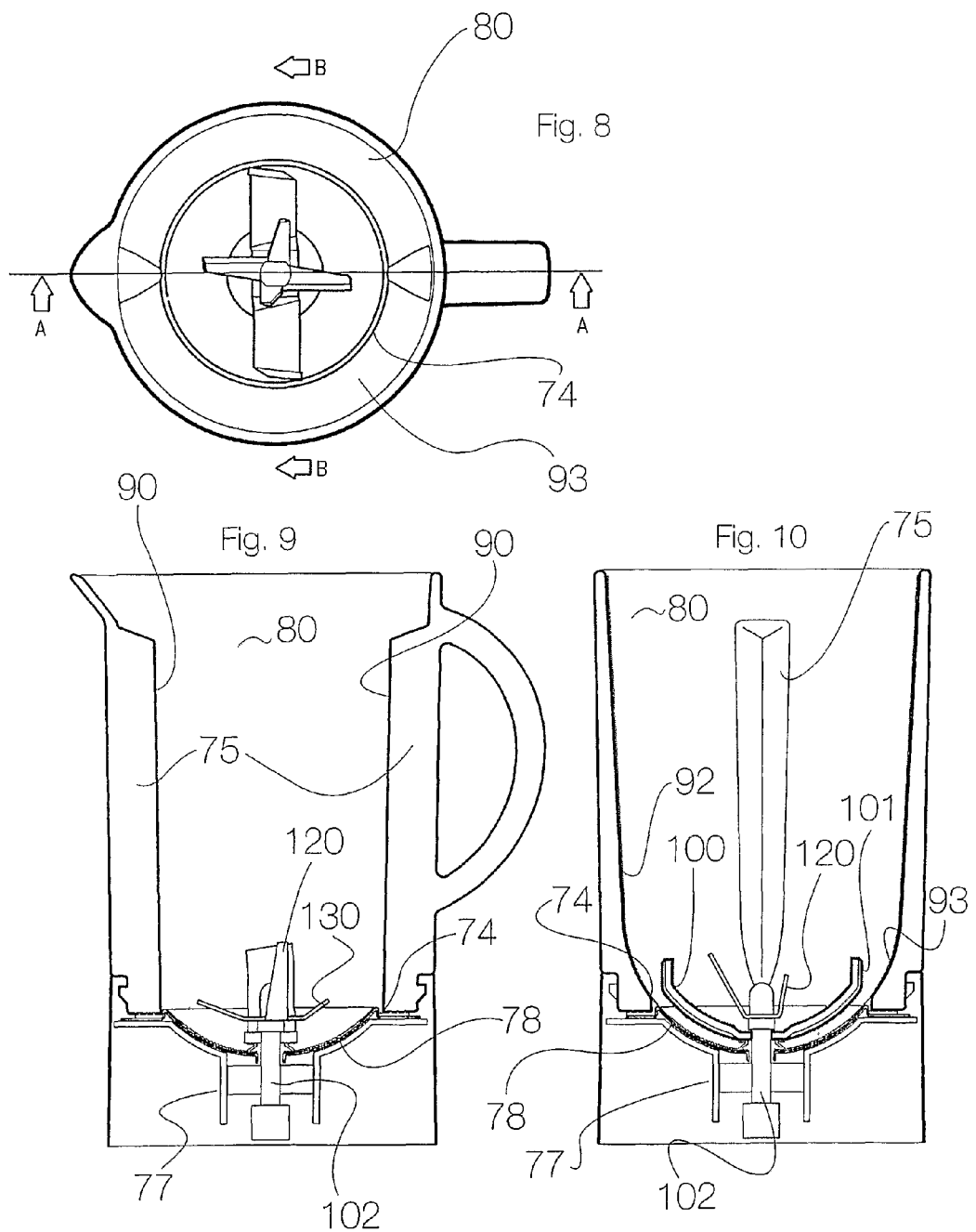

US 8,834,015 B2

BLENDER WITH CO-OPERATING JUG AND BLADES

FIELD OF THE INVENTION

The invention pertains to blenders and more particularly to a blender having a jug with an interior surface that has a generally bowl-like profile in the lower section and more particularly an upwardly reaching portion below the blades, the blades also preferably having an upwardly reaching portion.

BACKGROUND OF THE INVENTION

A blender typically comprises a motorised base onto which is mounted a jug. When the jug is mounted onto the base, a coupling half extending from a lower surface of the jug engages with a coupling half that is driven by the motor. The jug's coupling connects with a rotating blade or blade assembly within the jug.

The usefulness of a blender is sometimes limited because of uneven mixing within the jug and because some foods tend to accumulate below the blade, in the space between the blade and the jug's inter surface. Both of these factors contribute to uneven and inefficient processing of blended foods. Further, accumulation of solids beneath the blades makes cleaning the jug's interior more difficult and time consuming. Thus, a blender that can produce a more uniformly blended product is more desirable that one that does not.

OBJECTS AND SUMMARY OF THE INVENTION

It is an object of the instant hardware to provide a combination of jug and blade or blade assembly that contributes to the performance of a blender.

It is another object of the invention to provide a blade or blade assembly, and also a jug, such that the jug profile directly below the blade contains an upwardly inclined portion.

It is another object of the invention to provide a jug with an interior surface having a lower section that is rounded, particularly in the area below the cutting surfaces of its main blade or blades.

It is another object of some embodiments of the invention to provide a cutting assembly for a blender, the cutting assembly having curved or polyhedral main blades, preferably with upright blade tips.

In some preferred embodiments of the invention, the upper surface of the coupling assembly and the lower section of the interior of the blender form a generally continuous profile.

BRIEF DESCRIPTION OF THE DRAWING FIGURES

In order that the invention is better understood, reference is now made to the following drawing figures in which:

FIG. 2 is a top plan view of the device depicted in FIG. 1;

FIG. 3 is a cross-section along lines B-B of FIG. 2;

FIG. 4 is a cross-section through lines C-C of FIG. 2 showing a jug with a dish that conforms to a blade shape;

FIG. 5(*b*) is a first side elevation of the depicted in FIG. 5(*a*);

FIG. 5(*c*) is an end view of the blade depicted in FIGS. 5(*a*) and (*b*);

FIG. 6(*b*) is a side elevation of the cutting unit depicted in FIG. 6(*a*);

FIG. 6(*c*) is another side elevation of the blade depicted in FIG. 6(*a*);

FIG. 8 is a top plan view of the device depicted in FIG. 7;

FIG. 9 is a cross section through lines A-A of FIG. 8;

FIG. 10 is cross-section through lines B-B of FIG. 8;

FIG. 11(*b*) is a side elevation of the blade depicted in FIG. 11(*a*);

FIG. 11(*c*) is an end elevation of the blade depicted in FIGS. 11(*a*) and (*b*);

FIG. 12(*b*) is a side elevation of the blade unit depicted in FIG. 12(*a*);

FIG. 12(*c*) is another end elevation of the blade unit depicted in FIG. 12(*a*);

FIG. 12(*d*) is a partial end elevation of the blade unit depicted in FIG. 12(*a*) but with serrations;

FIG. 12(*e*) is a side elevation of a blade unit where the blades are inclined to the same degree;

FIG. 13(*b*) is a side elevation of a blade unit depicted in FIG. 13(*a*);

FIG. 13(*c*) is an end elevation of the blade unit depicted in FIG. 13(*a*);

BEST MODE AND OTHER EMBODIMENTS OF THE INVENTION

Figure 1:
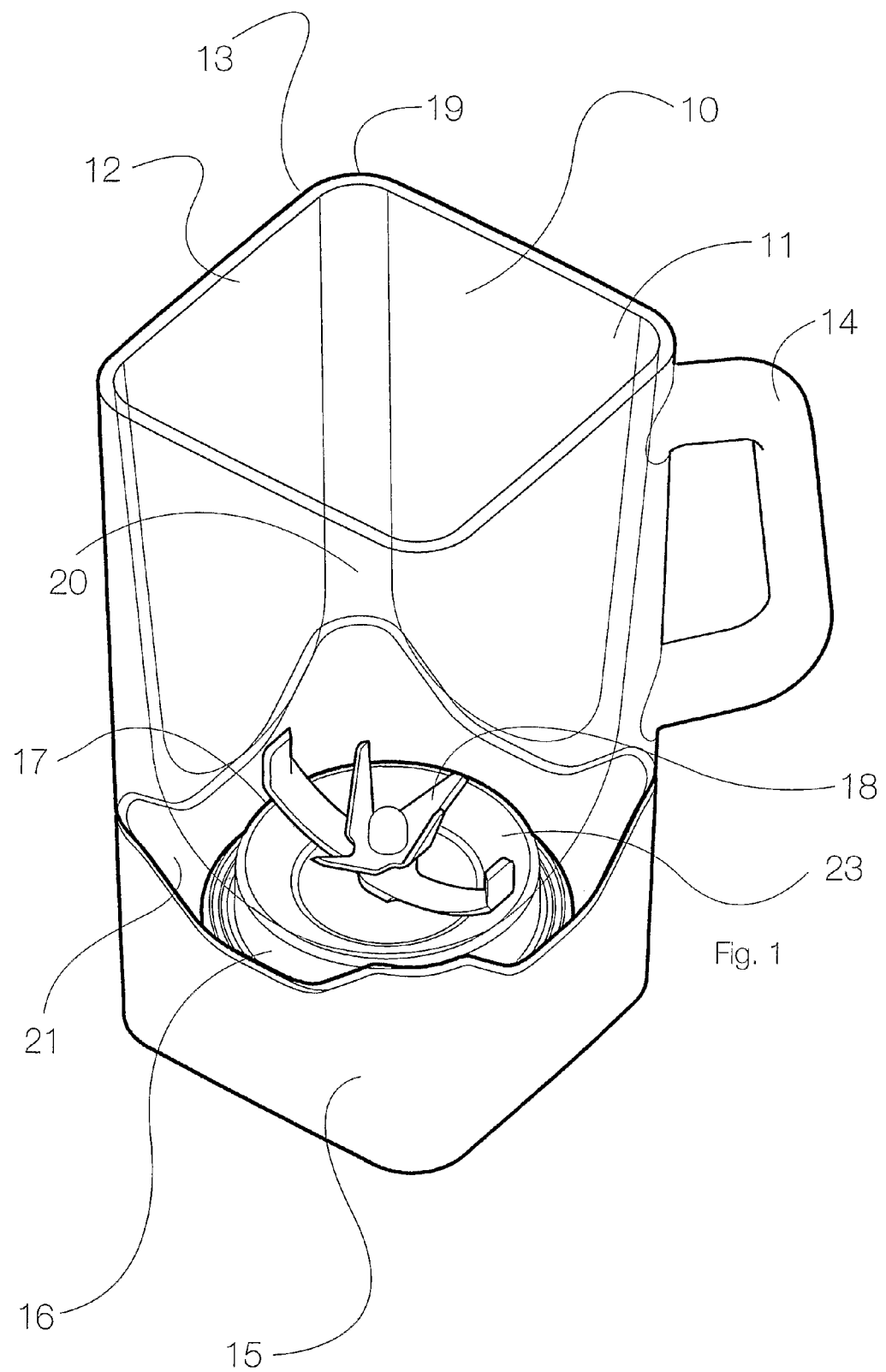
FIG. 1 is a perspective view of a jug and coupling assembly made in accordance with the teachings of the present invention.

As shown in FIG. 1, a jug 10 for a blender comprises a transparent container 11 with a main opening 12 defined by an upper rim 13. In this example, the container or body shape is primarily square in cross section and the container includes a handle 14. The body 12 is carried by a locking collar 15 that sits atop a motorised base (not shown). A rotating cutting assembly 18 fits within the jug 10.

In preferred embodiments, the part of the jug directly below the cutting assembly 18 (or concealed by the swept area of the cutting assembly 18) contains at least a portion which reaches upwardly towards the top rim. Upward reaching portions, in the context of this specification, can refer to straight inclines (conical sections) towards the top rim 13, or curved profiles that extend toward the top rim 13.

In the example shown in FIG. 1, the locking collar also receives a coupling assembly 16, portions of which fit within a through opening 17 located in a lower section of the container 12. The coupling-assembly 16, in turn, carries a rotating cutting assembly 18.

Referring to FIG. 1, the cutting assembly 18 comprises one or more blades that are attached to a rotating shaft. The rotating shaft passes through the coupling assemble 16 and its half coupling (not shown) is connectable to a co-operating coupling half carried by the motorised base. In the context of the present teaching, the maximum diameter of the cutting assembly 18 is limited by the diameter of the through opening 17 into which the coupling assembly is inserted. It is preferred that the maximum diameter of the various blades making up the cutting assembly not exceed the diameter of the through opening 17.

Note from the example depicted in FIG. 1 that the upper rim of the jug is generally square but having rounded corners 19. In this example, the horizontal cross section of the jug maintains this generally square cross section from the upper rim 13 to an inflection point 20 that is located between the opening 17 and the upper rim 13. Below this transition point 20, the corner radius gradually increases so that the lower section 21 of the internal cavity is smooth and longitudinally rounded as shown in longitudinal cross-section of FIGS. 3 and 4. The portion below the transition point 20 is referred to as the lower section of the container or jug. The lower section 21 thus forms a bowl shape having the central opening 17 formed in it.

As shown in FIGS. 2-4, the optional coupling assembly 16 further comprises an upper surface forming a stainless steel dish 23 that is surrounded by a generally cylindrical and descending sidewall 24. A horizontal flange 25 is carried by a lower edge of the sidewall 24. A polymeric seal 26 is interposed between the flange 25 and the lower rim 27 of the container. The stainless steel dish 23 is useful because is located primarily below the swept area of the main blades and can thus be used to define an upwardly reaching profile or shape that is optimised.

As shown is FIG. 3, the longitudinal curvature of the lower section 21 and the curvature of the dish 23 are complimentary, forming a generally smooth, continuous line of curvature that extends from adjacent to a central portion of the dish 23 through to the upper regions of the lower section 21. It will be understood that this generally continuous line of curvature is interrupted by the gap or joint between the dish 23 and the container. The dish may include a central flat portion 29 that in this example is the upper surface of an assembly that contains the shaft bearings and shaft onto which the cutting assembly 18 is mounted. An embodiment depicted in FIGS. 14-16 does not require the central flat portion 29. The embodiment shown in FIG. 17 has a dish with a raised central hub.

As shown in FIG. 4, the jug's shaft 40 is attached to the cutting assembly 18. The cutting assembly 18 includes a lower or main blade unit 41, a spacer 42 and an upper blade module 43. Note that the diameter of the main or lower blade unit 41 is maximised so as to be about the same as the diameter of the dish's sidewall 24. The main or lower blade unit 41 is preferably upwardly curved so that the curvature covers a substantial portion of the main blade unit. The main or lower blade unit 41 is curved to about the same extent as the curvature of the dish 23. The main or lower blade unit 41 also includes upturned and upright blade tips 44. Thus in this embodiment a curved gap 45 is defined between the main blade 41 and the upper surface of the dish 23, particularly toward the tips of the main blade unit 41. In this example, the upper blade module or unit 43 comprises four separate cutting edges formed from a single metal blank.

Figure 18:
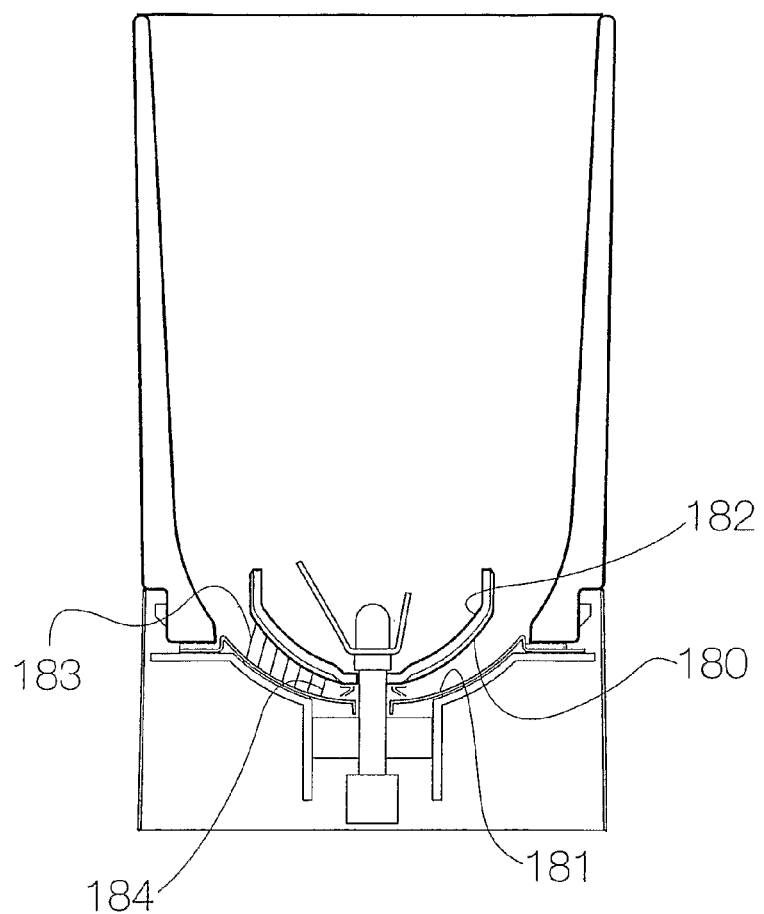
FIG. 18 is a side elevation of a jug showing a conforming blade.

The gap 45 depicted in FIG. 4 is depicted as relatively constant along the curved portion of the dish. In this way the lower blade 41 is said to conform to the curvature in the dish 23 in examples of this type. In preferred embodiments the spacing or depth of the gap is no more than about 15 mm measured, as shown by arrows 45 in FIG. 4, between the closest points on the blade 41 and dish 23 (not vertically). The lower blade 180 depicted in FIG. 18 is also said to conform to the shape of the dish 181 even though the gap is not constant. In that example, the end 182 of the lower blade (at the point where the blade bends upwardly into the upright blade tip) forms a gap 183 that is wider than the gap 184 measured at the root of the blade 180. The blade is said to conform because the gap does not exceed about 15 mm. In preferred embodiments of the conforming blade, an increasing gap of this type also has the properties of increasing in size going from the root to the tip of the blade. In particularly preferred embodiment the gap increases smoothly and without abrupt transitions.

Figure 5:
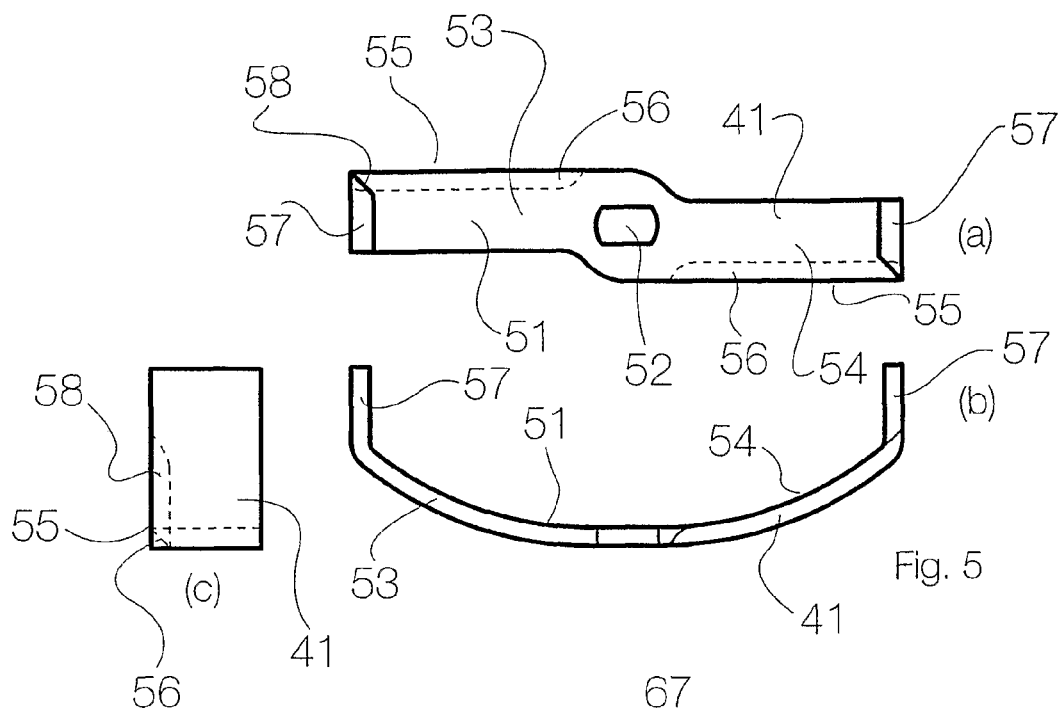
FIG. 5(*a*) is a top plan view of a main blade with offset.

An optimised lower or main blade unit for a square jug is depicted in FIGS. 5a, b, and c. The main blade unit 41 comprises an arcuate body portion 51 having a central opening 52. Opposite offset arms 53, 54 of the body each carry a cutting edge 55. The cutting edges are bevelled so that the facet 56 faces downwardly and into the direction of rotation. Each upright blade tip 57 also features a cutting edge with a bevel facet surface 58 facing inward and into the direction of rotation. Note that the longitudinal centre lines of the two arms 53, 54 are slightly offset with respect to one another.

Figure 6:
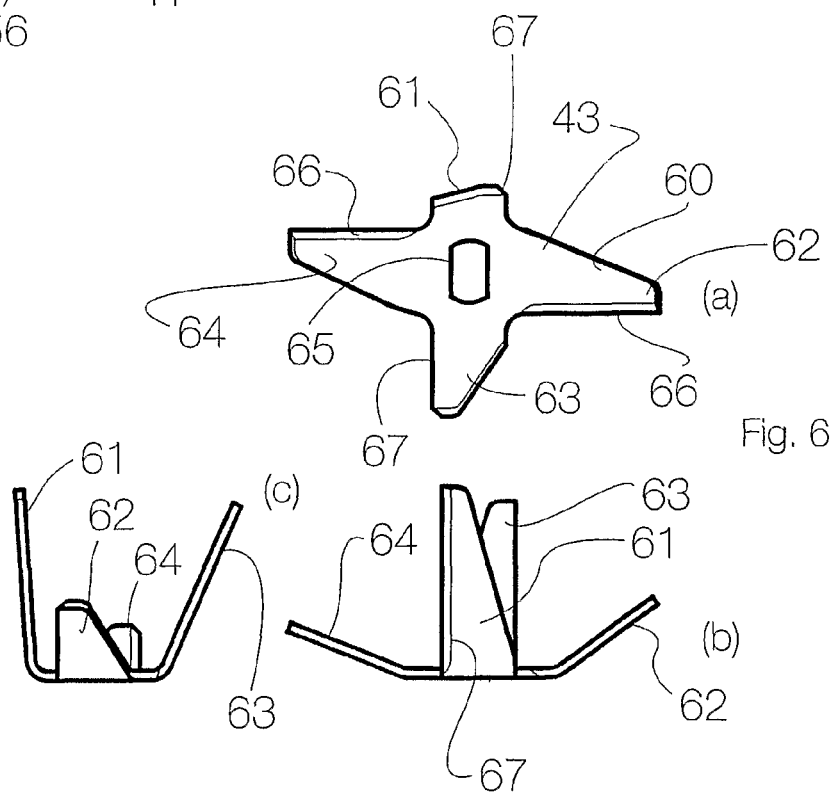
FIG. 6(*a*) is a top plan view of an upper or secondary cutting unit.

An optimised upper blade unit 43 for the blender jug of FIGS. 1-4 is depicted in FIG. 6. Note that a single metal blank 60 has been formed with more than two, e.g. four, minor arms 61, 62, 63, 64 forming blades that are generally 90 degrees offset from one another about the central opening 65. In some embodiments, at least one of the minor arms has e.g. semicircular or saw-tooth serrations. Each blade features a cutting edge and each blade is inclined in respect to the horizontal to a different extent. One of the blades 61 is almost vertical. An opposite blade 63 is more inclined from the vertical but less inclined than a third blade 62. The forth blade 64 is the most inclined from the vertical. The bevel or facet of the cutting edges of the less inclined blades 62, 64 is upwardly directed 66. The bevelled edge 67 of the pair of more up right blades 61, 63 faces outward.

Owing to the spacer 42, the upper blade module in carried above and spaced from the main or lower blade 41.

Figure 7:
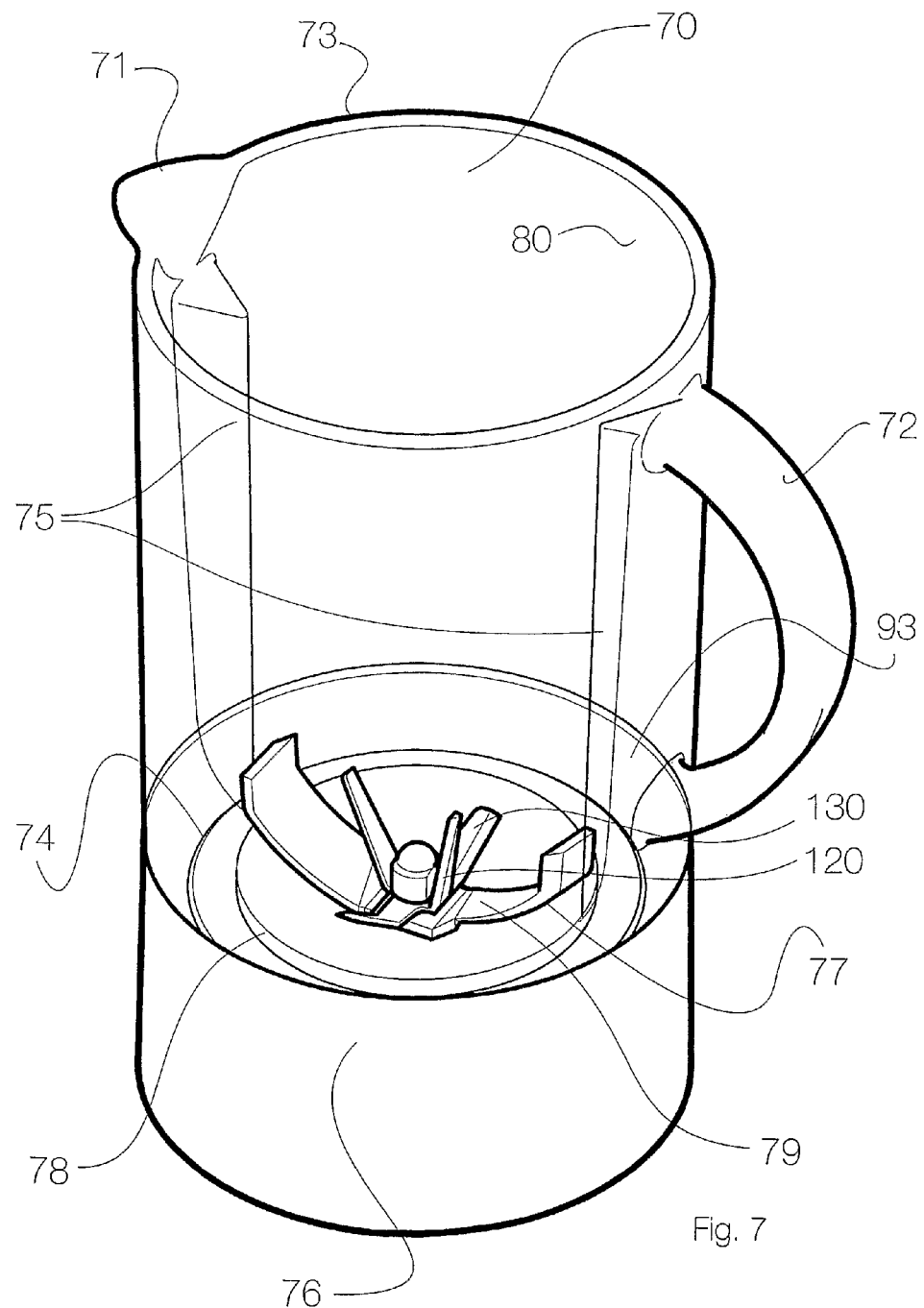
FIG. 7 is a perspective view of another embodiment of the jug and coupling assembly of the present invention.

A second embodiment of the present improvements is depicted in FIG. 7. In this example, the jug body or container 70 is generally round in horizontal cross section. The container 70 features a spout 71 and an opposing handle 72. The interior of the body is also round in cross section, tapering from a maximum diameter near the upper rim 73 to a transition or inflection point 92 (see FIG. 10) then curving toward a minimum diameter near the central opening 74. The jug body 70 features a pair of opposing internal ribs 75. As better shown in FIG. 9, the tips of the ribs go may be generally vertical and parallel with one another. The ribs are generally triangular in cross section. Similar to the embodiment depicted in FIG. 1, the jug features a locking collar 76 and features a coupling assembly 77 that includes a stainless dish or dish portion 78. A slightly different cutting assembly 79 is utilized with this example will be more fully explained below.

As shown in FIGS. 8-10, and ignoring the vertical ribs 75, the lower section 93 of the interior walls 80 of the container curve so as to conform and blend smoothly with the line of curvature established by the stainless dish 78 of the coupling assembly 77. A circular seam or circumferential gap is seen between the dish 78 and the container.

As suggested by FIG. 10, the main blade unit 100 of the cutting assembly 79 is about the same diameter as the jug's lower central opening 74. The main or lower blade unit 100 is curved from its central opening to the upright tips 101 so as to conform to the curvature of the dish 78. Note from the illustration of FIGS. 9 and 10 that the upper blade units 120, 130 are attached to the jug's rotating shaft 102, just above the main blade unit 100, there being no significant spacer between them.

Figure 11:
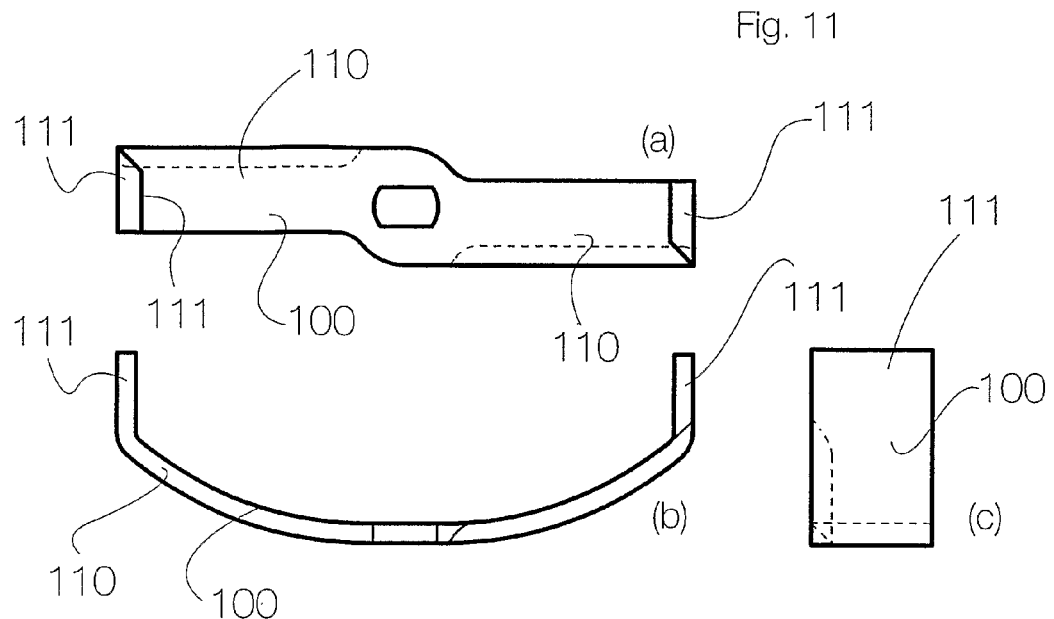
FIG. 11(*a*) is a top plan view of another main blade in accordance with the teachings of the present invention.
Figure 12:
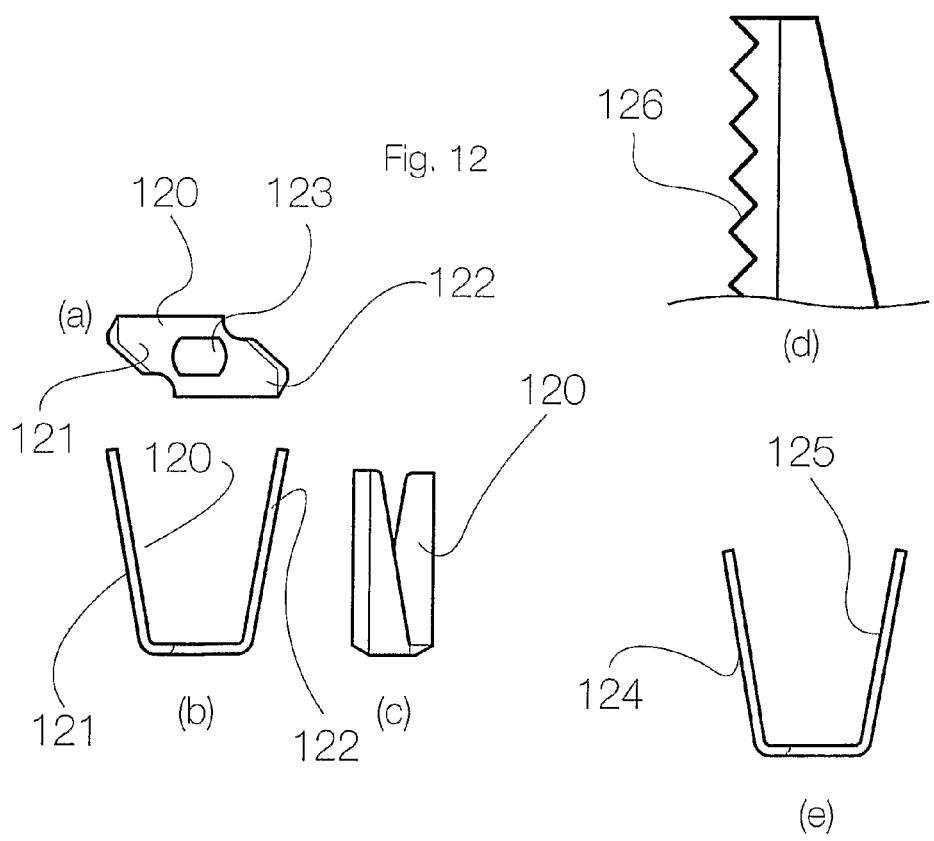
FIG. 12(*a*) is a top plan view of an upper blade unit.
Figure 13:
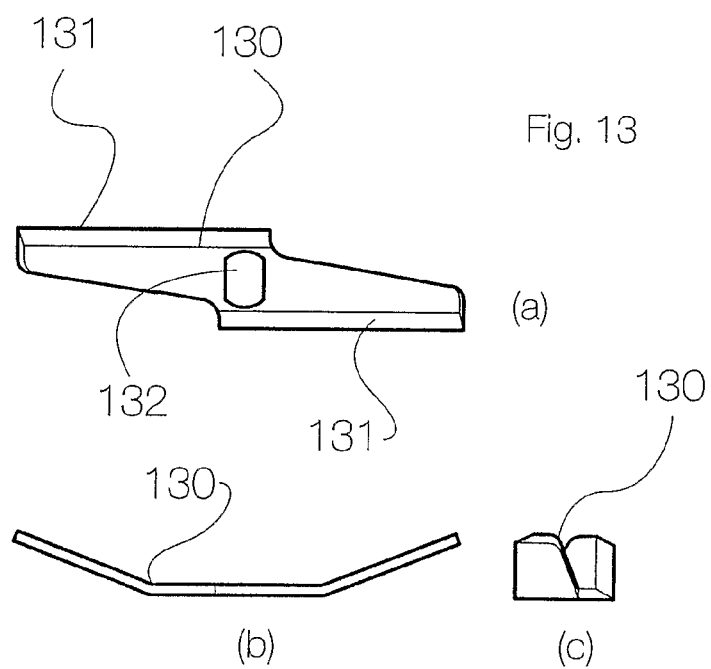
FIG. 13(*a*) is a top plan view of another upper blade.

Upper and lower blades optimised for a rounded jug are disclosed with reference to FIGS. 11-13. As shown in FIG. 11(a) the main or lower blade unit 100 comprises an arcuate or curved main body 110 having upturned or generally vertical blade tips 111. In this example, the main blade unit is both arcuate and slightly twisted about its longitudinal axis so that when it rotates, it delivers a greater down force than it would if it was untwisted. Note that the bevelled faces of the cutting edges of the main body portion 110 and the wing tips 111 are directed downwardly or outwardly, that is, away from the longitudinal centreline of the container. This also creates an optimized down and outward force produced from the rotation of the blade. In this example, the tips 111 also have an angle of attack, with respect to the direction of rotation that tends to urge food outward toward the sidewalls of the jug.

As shown in FIGS. 12 and 13, the upper blade units are formed from two separate blanks. An internal blade pair 120 is formed from a single blank and carries a pair of opposed blades 121, 122. Each of the blades in 121, 122 are inclined at different angles and each is tapered from a maximum width near the central opening 123 to a minimum width near the blade tip. FIG. 12(d) shows the example where the upper blades have serrations 126. In an alternate embodiment depicted in FIG. 12(e), the blades 124, 125 have the same characteristics as those shown in FIG. 12(a) to 12(c), but are inclined at the same angle. The external or intermediate blade pair 130 is depicted in FIG. 13. This blade pair features upwardly directed bevelled edges 131 that define generally straight cutting edges. Each of the blades tapers from a maximum width near the central opening 132 to a minimum width near the blade tip.

Figure 14:
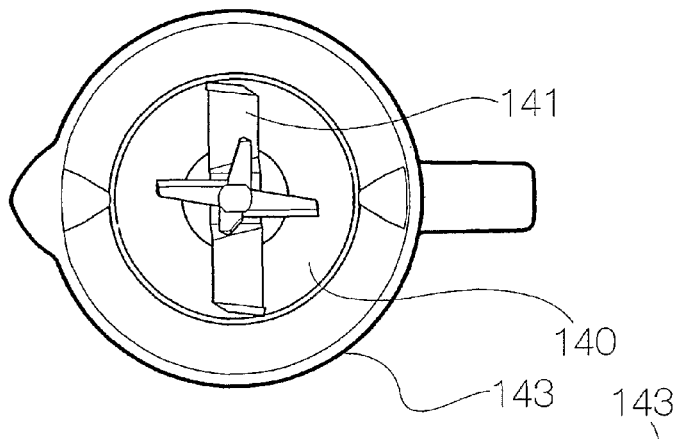
FIG. 14 is a top plan view of another embodiment.
Figure 15:
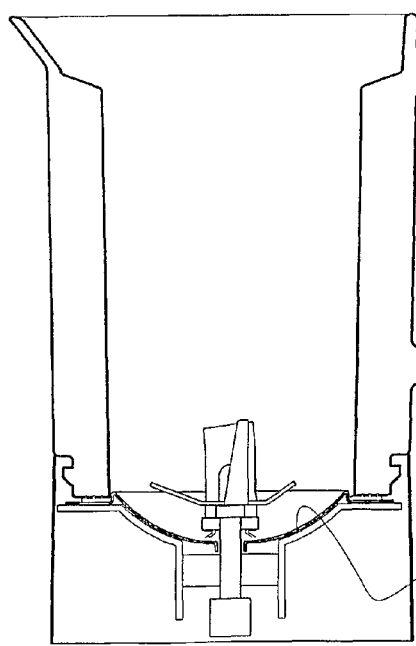
FIG. 15 is a side elevation of the embodiment depicted in FIG. 14.
Figure 16:
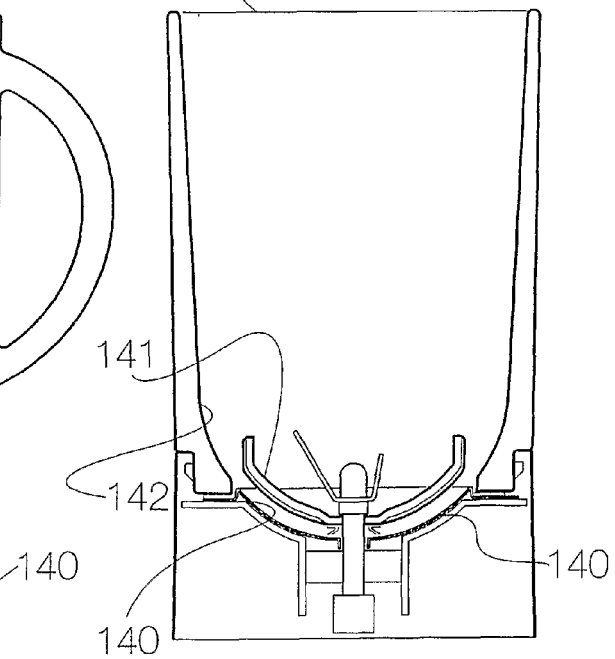
FIG. 16 is another side elevation of the embodiment depicted in FIG. 14.

As shown in FIGS. 14-16 another preferred embodiment is depicted. In this example, the dish 140 of the coupling assembly lacks any central flat portion and is thus smoothly curved at essentially all points below the lower blade. In this example as in others, the rounding below the transition point 142 in the jug is smooth and generally continuous with the shape of the dish. In a longitudinal plane, the curvature of the interior of the jug is thus continuous (except in the area of any optional vertical ribs) from the upper rim 143, down to a location below the lower blades. The circumferential gap between the dish and the jug is disregarded. In preferred embodiments, the continuous curvature extends below a substantial part of the working portion of the lower blades and in the example of FIGS. 14-16 the curvature extends practically to the root of the blades 141.

Figure 17:
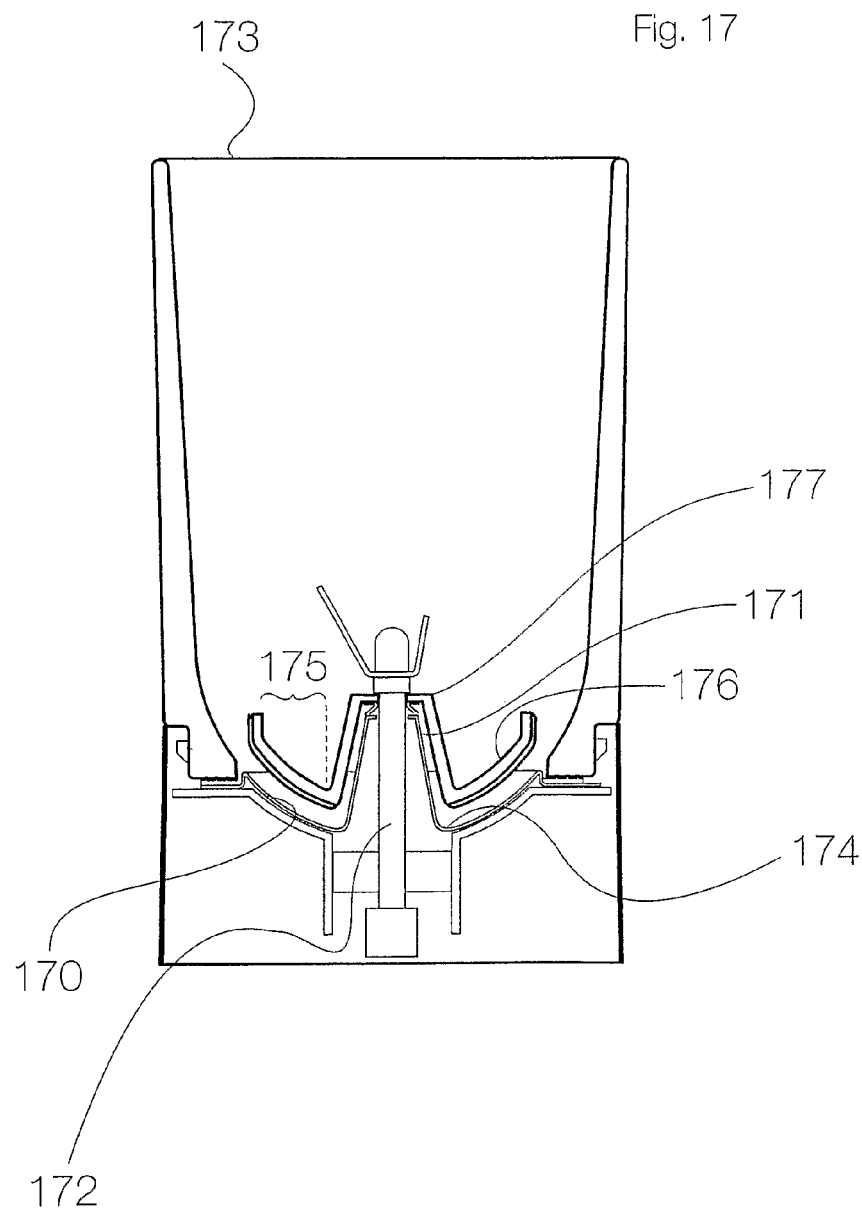
FIG. 17 is a side elevation view of a further embodiment showing a dish with a hub.

Another embodiment is depicted in FIG. 17. In this example, the dish includes a raised central hub 171 through which passes the shaft 172. The blade or main blade unit 176 has an intermediate flat raised portion 177 between the arms, this intermediate portion also defining a raised central hub. The jug's interior curvature is still considered continuous because it is generally continuous from the upper rim 173, reaching down to a point 174 that extends below substantially all of the working or cutting portion 175 of the lower blade 176. The blade 176 is said to cooperate or conform to the dish 170 because the gap between blade 176 and dish 170 is not greater than about 15 mm and does not substantially narrow toward the tip under any part of the cutting portion 175.

Figure 19:
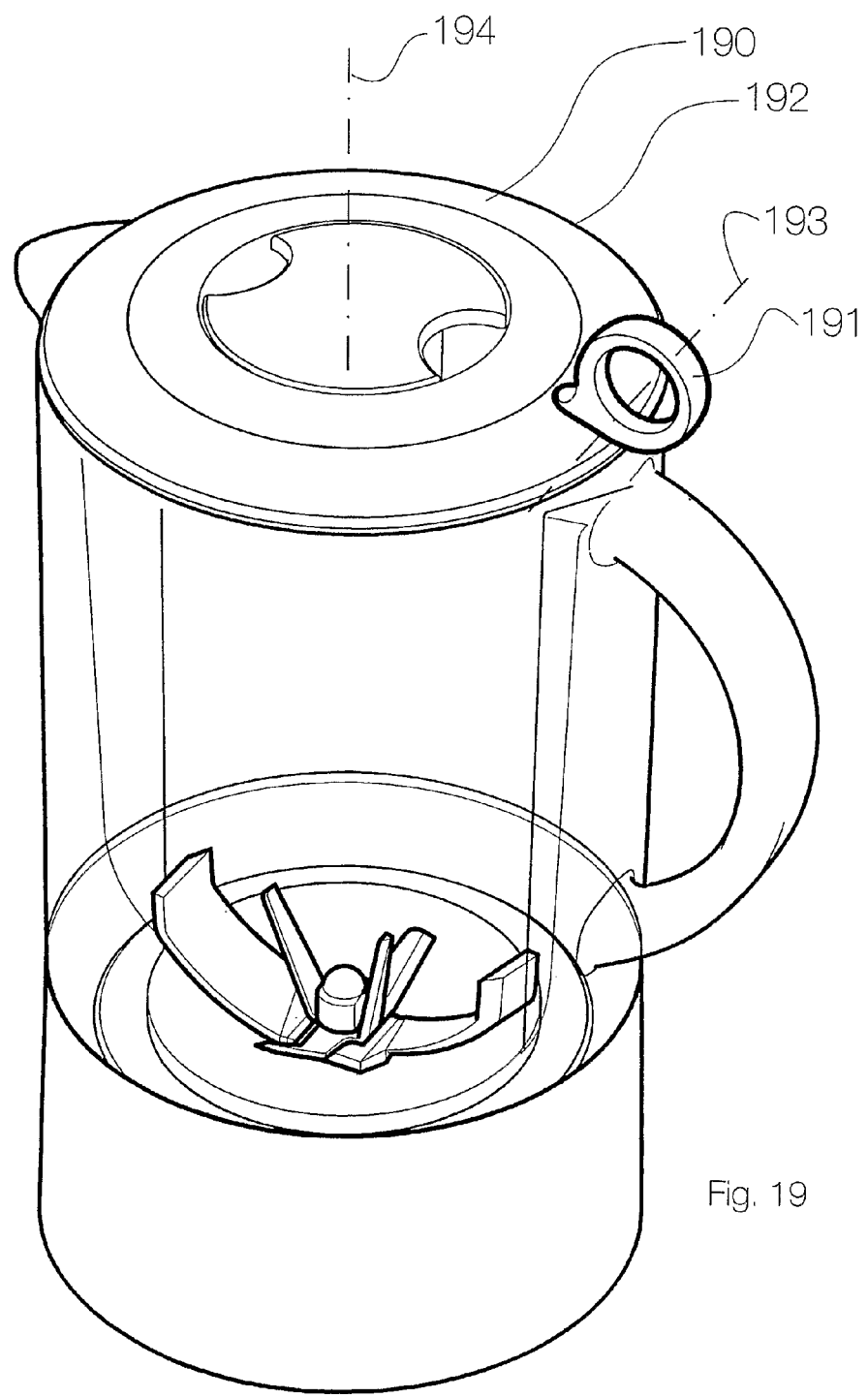
FIG. 19 is a perspective view of jug showing lid and ring pull.

An optional pull tab feature is shown in FIG. 19. As shown there, removal of the polymeric lid is facilitated by providing the lid 190 with a pull tab 191. The pull tab 191 has a finger-sized or larger opening, and forms a preferably generally continuous circular ring above the upper surface of the lid. It may extend fully or partially beyond the outer edge 192 of the lid for increased leverage and ease of storage by hanging. The central axis 193 of symmetry of the opening is perpendicular to the longitudinal axis 194 of the jug. Because the jug may be tight fitting to avoid inadvertent removal or spillage during use, and wet as a result of use, a pull tab of this kind makes removal of the lid by the user easier.

As explained above, a blender has been devised that utilises the cooperation between the jug's interior geometry and the blades, particularly the lower blade to produce a more efficient mixing action when in operation. While blade shape is important and some blade shapes work better than others and some blades are better adapted to different jug configurations (as explained above), the principle benefits of the improvements are delivered by practicing the interior curvatures taught above with regard to the jug's interior. Various methods of jug construction may be employed to yield the continuous curvatures described above, the provision of a jug and cooperating coupling assembly with dish being only one technique and not deemed absolutely essential to the functioning of the device.

Figure 20:
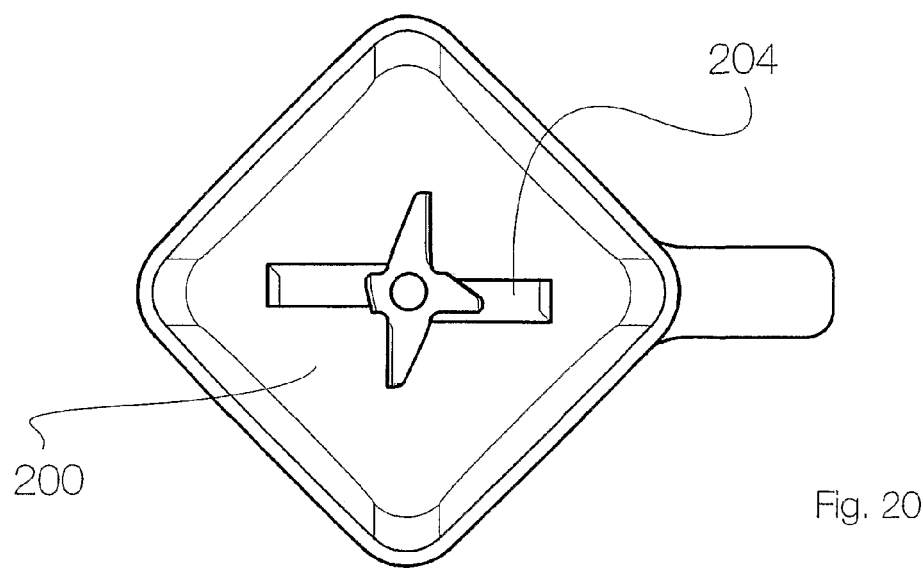
FIG. 20 is a top plan view of another embodiment.
Figure 21:
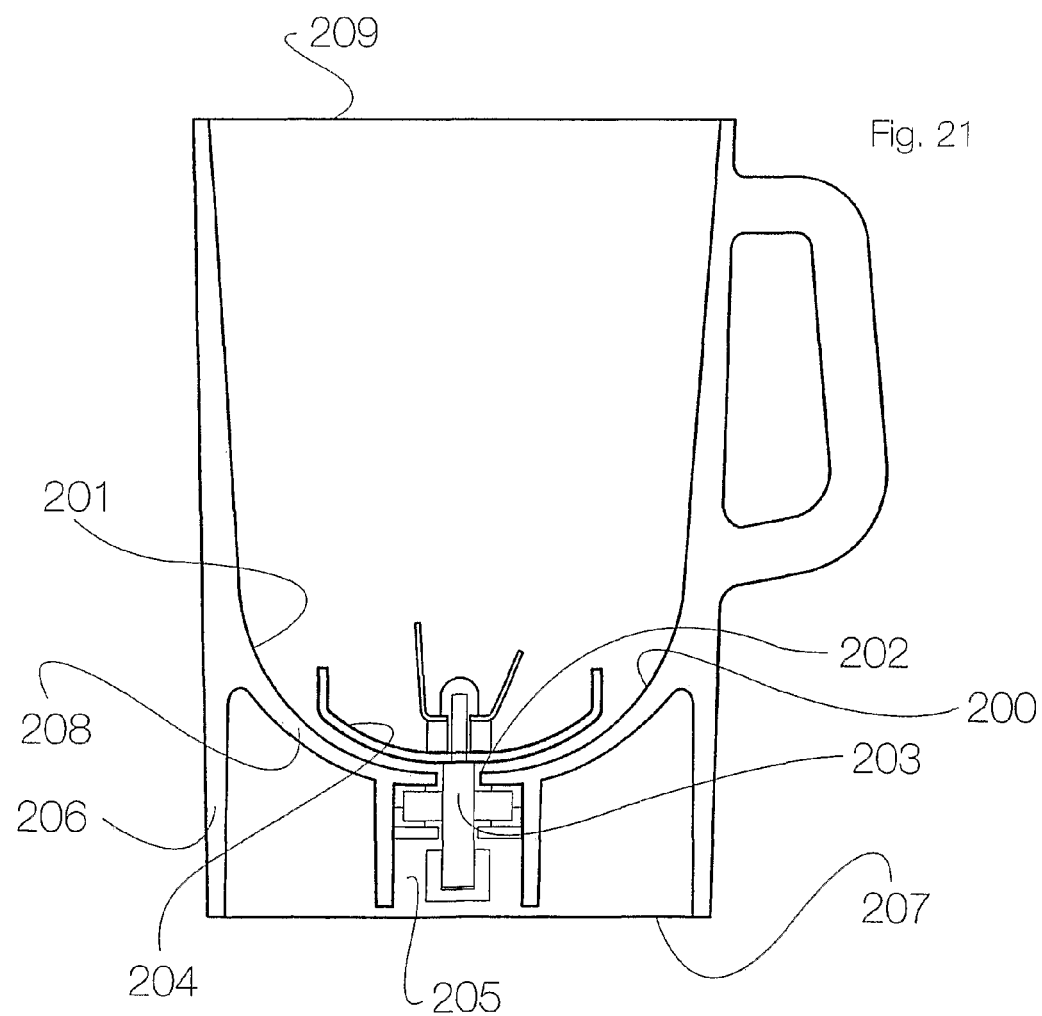
FIG. 21 is a cross section through the device of FIG. 20.

As shown in FIGS. 20 and 21 a jug with a rounded lower section and cooperating or conforming blade need not have a removable coupling assembly. As shown in these figures, the rounded lower section 200 extends from the transition point 201, continuously and without any joint or seam to an opening 202 through which the shaft 203 extends. Note that the curved lower blades 204 of the cutting assembly conform to the curvature that is beneath them in the lower section. The bearings for the shaft 203 are contained in a shrouded recess 205 that is formed into the underside of the lower section. In this example, a skirt 206 extends to the lowest edge 207 of the jug. Thus a web 208 is formed between the upper 209 and lower edge 207 of the jug, this web forming, in part, the lower section 200 and having formed in it, the opening 202.

Although concave curved main blade units are described above, it is appreciated that the blade shape may vary as long as the main blades have at least a portion that is upwardly inclined or upwardly reaching.

Figure 22:
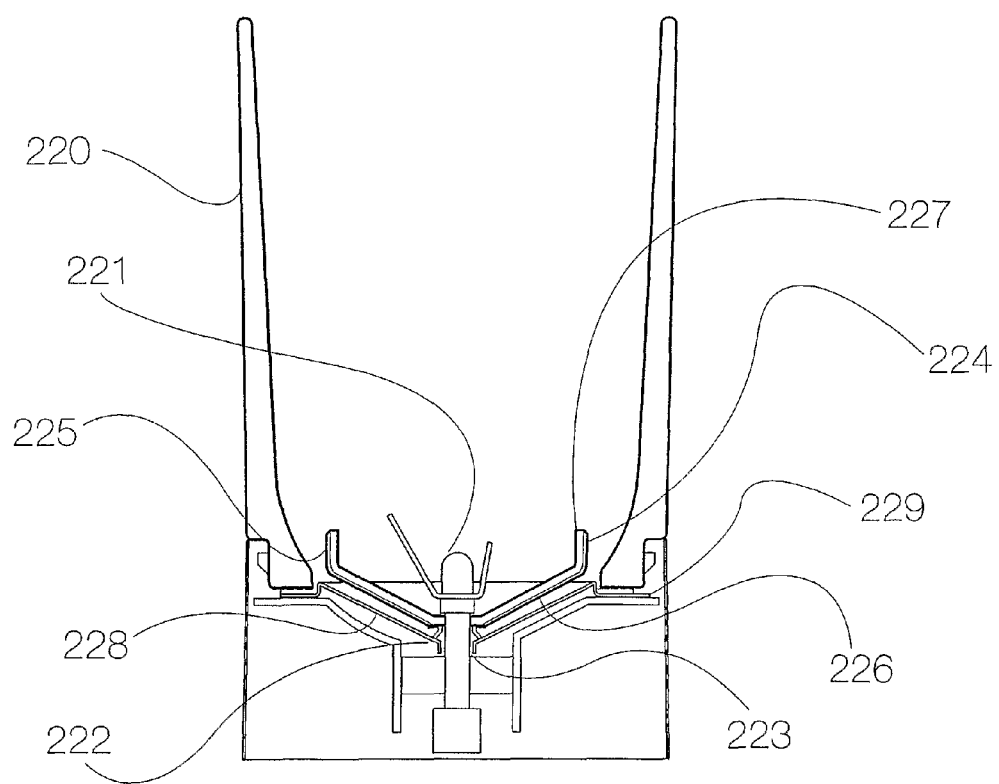
FIG. 22 is a cross section of a further embodiment where the main blade unit has a straight profile.
Figure 23:
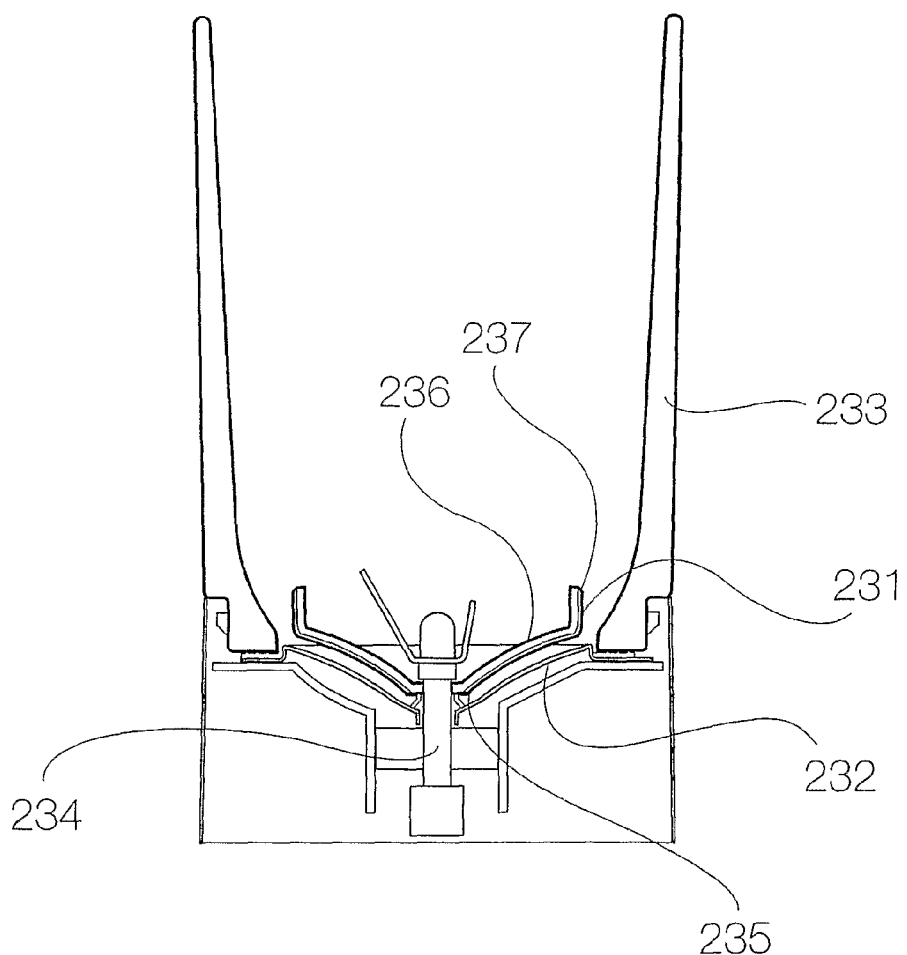
FIG. 23 is a cross section of another embodiment where the main blade unit has a convex profile.
Figure 24:
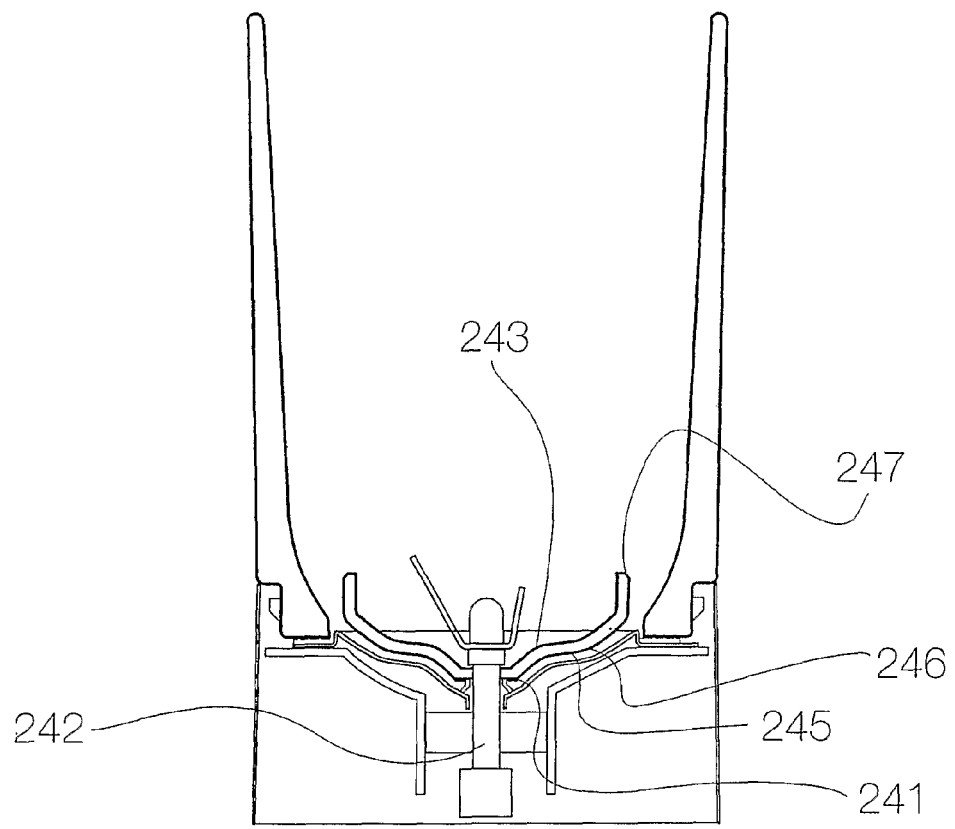
FIG. 24 is a cross section of still another embodiment where the main blade unit has a random profile.

By way of example, FIGS. 22, 23, and 24 show three alternative embodiments which all adhere to the following principles: at least a portion of the main blade unit inclines or reaches upwardly, and the main blade unit cooperates with (or conforms to) the shape below the main blade. Conformity here means that a gap between the main blade and the dish is not greater than about 15 mm and does not substantially narrow toward the tip of the main blade under any part of the blade's cutting portion. More generally, at least a portion of the main blade unit inclines or reaches upwardly, and at least a portion of the jug below the swept area of the blades also inclines or reaches upwardly.

For example, FIG. 22 shows an embodiment where the stainless dish 222 from the coupling assembly has a central opening 223 located at the lowest part of the jug profile, and a shaft 221 passes through this central opening. The main blade arms 224, 225 are generally upwardly inclined. Each arm extends upwardly from the shaft, and contains a straight section 226, then bends towards an upright tip 227. The stainless dish 222 also has a straight (linear) profile or conical section 228 which cooperates with the main blade arms 224, 225. The dish 222 has a horizontal flange 229 that is carried below the jug or container's sidewall 220.

FIG. 23 shows an embodiment with an analogous relationship between the shaft 234, main blade arm 236, the stainless dish 232, and the container 233. The main blade arm 231 extends from a lowest part 235 near the shaft 234, and then curves upwardly in a full length uniform convex curve 236, before bending into an upright tip 237.

FIG. 24 shows yet another embodiment that is similar to the one in FIG. 23, but each main blade arm has a compound profile. A lowest part of the arm 241 extends from the centrally located shaft 242. The lowest part 241 is approximately horizontal and extends into a convex portion 243. The arm becomes almost horizontal in a middle portion 244, and then follows a concave curvature from this portion at an inflection point 246 before bending into an upright tip 247.

Figure 25:
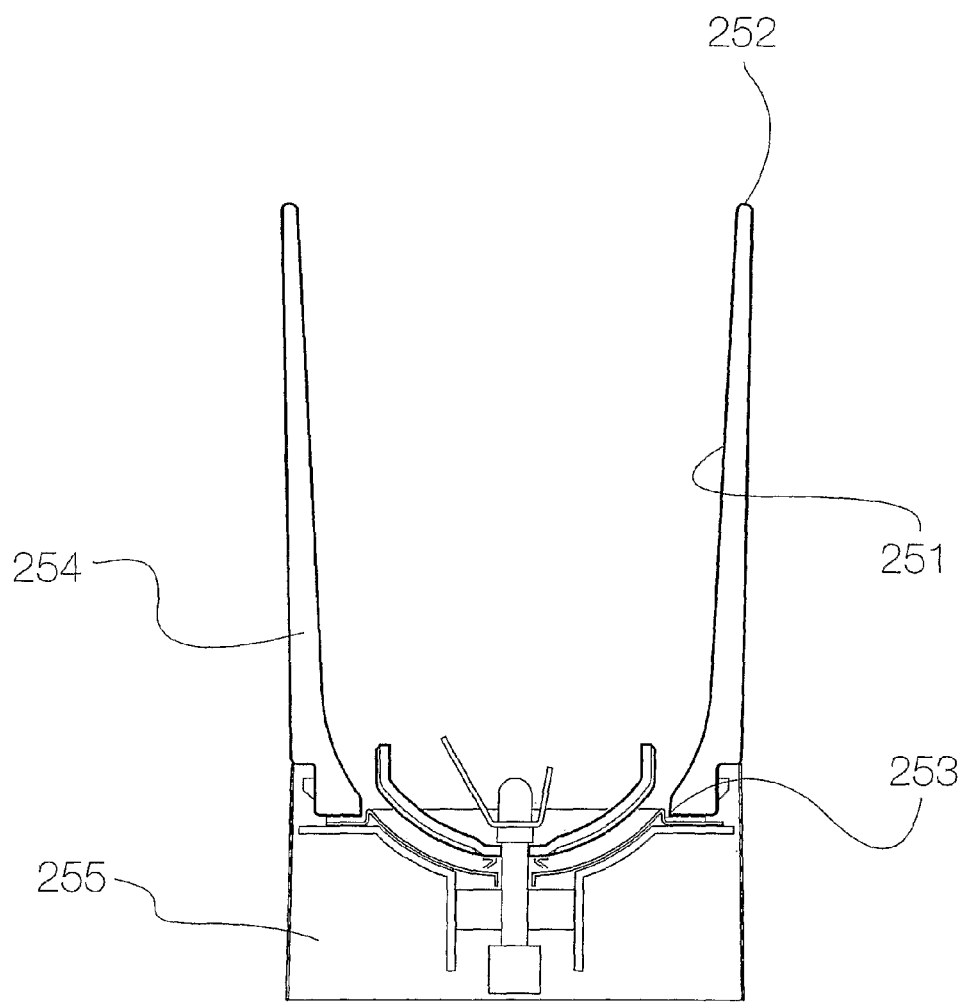
FIG. 25 is a cross section of another embodiment where the inflection point is at the junction between the jug and the stainless steel dish.

FIG. 25 shows an embodiment similar to the example shown in FIG. 16 but with the following differences. In this embodiment, the inflection point 253 is located at the junction between the jug 254 and the base 255. The interior surface of the jug 251 is therefore a straight tapered line from the top rim 252 to the inflection point 253.

Figure 26:
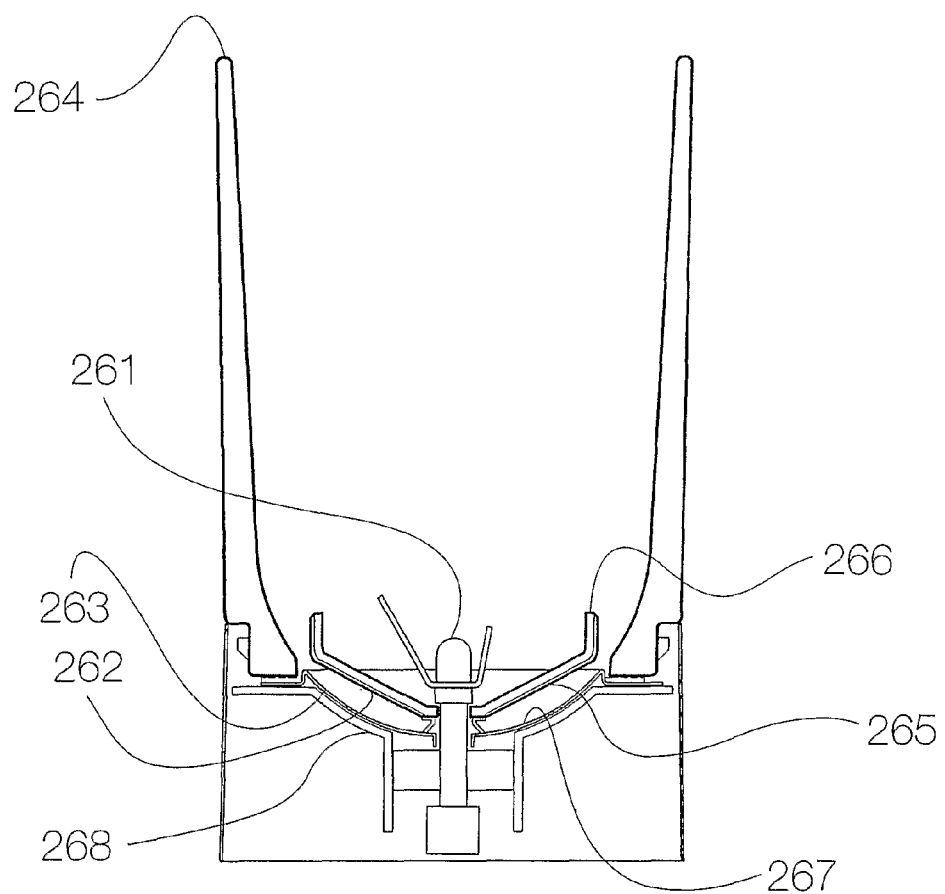
FIG. 26 is a cross section of another alternate embodiment where the jug profile below the main blade curves or reaches upwardly toward the top rim, and the main blade inclines or reaches in a straight line toward the top rim.
Figure 27:
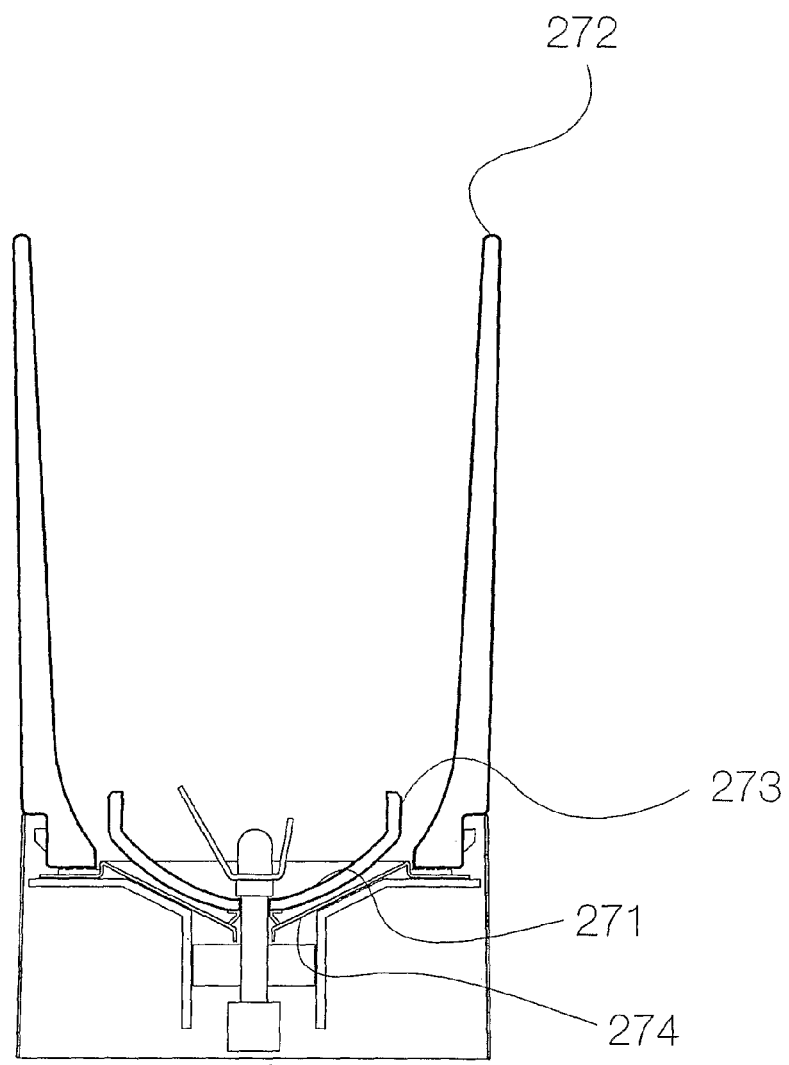
FIG. 27 is a cross section of an embodiment where the jug profile below the main blade inclines in a straight line towards the top rim and the main blade curves towards the top rim.
Figure 28:
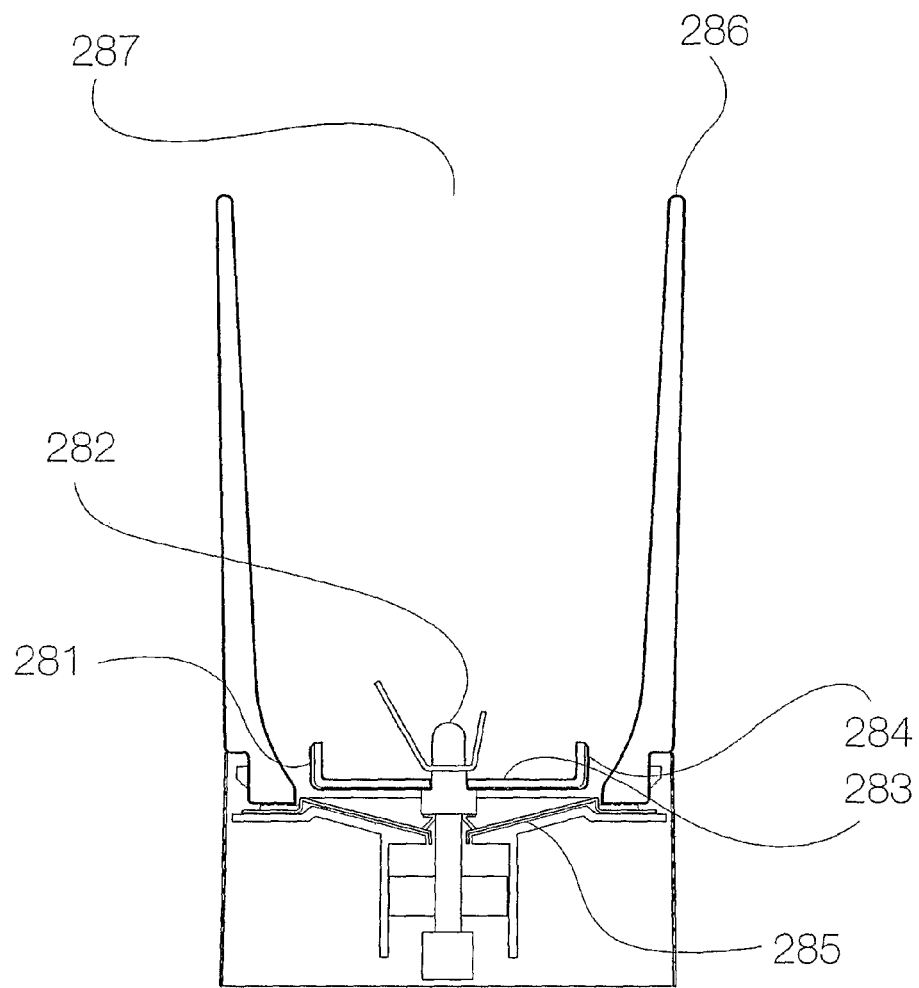
FIG. 28 is a cross section of an embodiment where the jug profile below the main blade inclines in a straight line towards the top rim, and the main blade is flat, but for the tips.

Note that in the previous embodiments disclosed, the part of the jug below the swept area of the main blade has a cooperating profile with the main blade. FIGS. 26, 27, and 28 show some more general examples where the profile or shape of the jug's interior below the main blade and the main blade profile are different but both profiles include portions that reaching upwardly toward the top rim.

In FIG. 26, the rotating shaft 261 is centrally located at the lowest part of the jug profile. Each main blade arm 262 extends from the shaft, reaches upwardly toward the top rim 264 in a straight incline 265, and then bends into an upright tip 266. The stainless steel dish 263 also extends from the shaft 262, but it reaches upwardly toward the top rim 264 in a curve. It can be seen from FIG. 26 that the entire upwardly reaching portion of the dish is directly beneath the entire upwardly reaching main blade portion 265. Note that in this example, a surface of the base 268 conforms to the profile of the dish 263, this quality may be desired in some embodiments but is not essential.

FIG. 27 shows an example similar to FIG. 26, except for the following. The upwardly reaching main blade portion 271 is substantially the full working length of the main blade. Thus the entire blade curves towards the top rim 272 before bending into an upright tip 273. Also, the upwardly reaching dish portion 274 is a straight incline towards the top rim 272 under the entire main blade length.

FIG. 28 is a further embodiment, where the main blade 281 extends from a centrally located shaft 282, and comprises a straight, flat portion with no incline 283 and an upright tip 284. The dish 285 reaches toward the top rim 286 in a straight incline directly beneath the swept area of the flat main blade portion 283.

Figure 29:
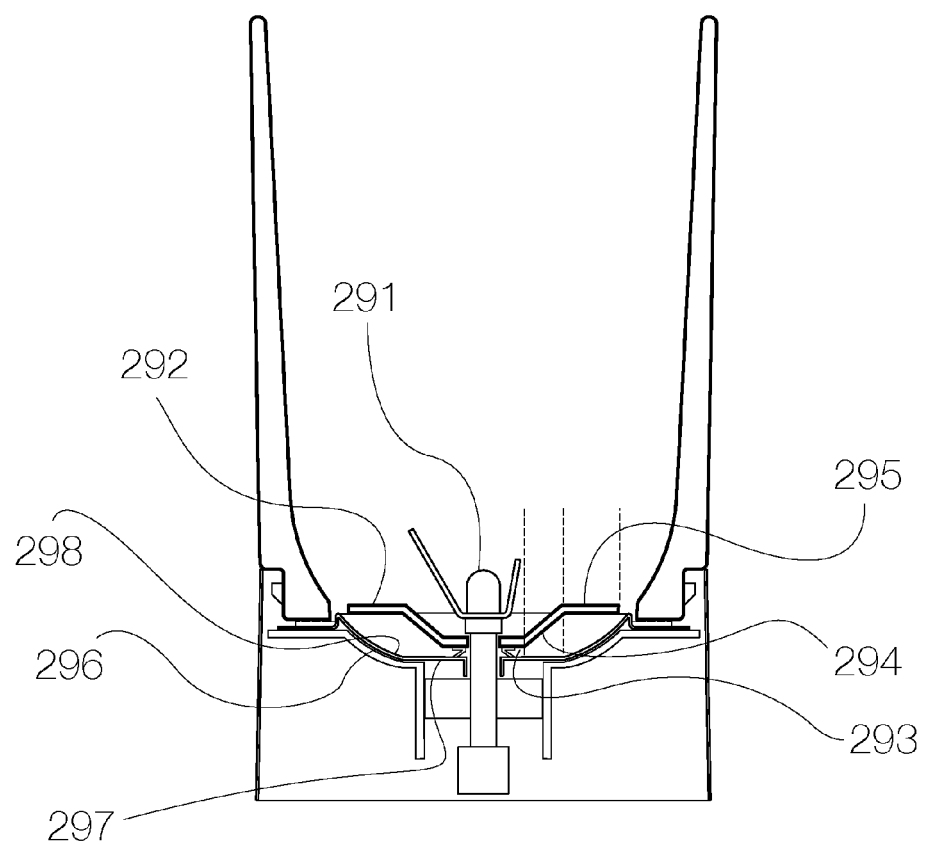
FIG. 29 is a cross section of an embodiment where the jug profile below the main blade and the main blade profile each contains upwardly reaching portions, but the upwardly reaching portions of the jug is not below the upwardly reaching portion of the blade.

FIG. 29 shows another embodiment. Extending from a centrally located shaft 291, the main blade 292 comprises a first flat portion 293, a middle straight incline portion 294, and a second flat portion 295. The dish 296, still generally concealed by the swept area of the main blade, comprises a flat dish portion 297 and an upwardly curved dish portion 298. The flat dish portion is underneath the first flat main blade portion 293 and the middle incline main blade portion 294, whereas the upwardly curved dish portion 298 is underneath the second flat main blade portion 295. Thus, the flat part of the dish is vertically aligned with an upwardly reaching part of the main blade, and the second flat portion of the main blade is vertically above the upwardly reaching portion of the jug's profile below the main blades.

While the above disclosed technology has been described with reference to particular details of construction, these should be understood as having been provided by way of example and not as limitations to the scope of the invention.

What is claimed is:

1. An apparatus including a blender jug and a cutting assembly;
   the cutting assembly comprising a main blade having at least two main arms that reach upwardly outwardly within the jug, and rotating the main blade defines an area swept through by the main arms;
   the jug comprising a lower portion that defines an upwardly radially-outward reaching lower interior surface within the jug; the lower interior surface being a curved concave surface that conforms with the profile of the main arms;
   the jug further comprising an upright outer sidewall that defines a interior side surface of the jug having a substantially straight profile;
   a transition point on the inner surface of the jug being the intersection between the upwardly radially-outward reaching lower surface and the substantially straight interior side surface of the jug; the transition point about the side of the jug defines a continuous transition contour;
   wherein the area swept through by the main arms of the rotating blade is spaced directly above and conforming with an underlying portion of the lower interior surface of the jug; the underlying portion defines an upwardly radially-outward reaching surface within the jug; and
   wherein the main arms are located within the jug such that the continuous transition contour is located within an inner surface region of jug that extends from a point horizontal to the main blade to a point above the main blade.

2. The apparatus of claim 1, wherein,
   each main arm is upwardly curved along a full length.

3. The apparatus according claim 2, wherein,
   an upright blade tip is located proximal to an outer end of each main arm.

4. The apparatus according to claim 1, wherein,
   each main arm further comprises a cutting edge that faces downwardly and into a direction of rotation.

5. The apparatus according to claim 1, wherein,
the cutting assembly is mounted on a coupling assembly that defines the underlying portion of the interior surface of the jug.

6. The apparatus according to claim 1,
wherein the cutting assembly further comprising an upper blade module having two or more minor arms that reach upwardly outwardly within the jug, the upper blade module being co-axially spaced above the main blade, wherein the area swept through by the minor arms is less than the area swept through by the main arms;
each minor arm is vertically inclined to a different degree to the main arms.

7. The apparatus according to claim 5, wherein,
the main blade has an intermediate raised portion interconnecting the arms, the portion shaped to conform to an elevated central hub in the lower portion of the jug.

8. The apparatus according to claim 5, wherein,
the main blade has two main arms that are joined together and offset.

9. The apparatus according to claim 5, wherein,
the outwardly-upwardly reaching surface of the jug is defined by a metallic dish.

10. The apparatus according to claim 1, wherein,
a cross section of the jug is generally round.

11. The apparatus according to claim 2, wherein, the upwardly reaching portion of the main arms and the upwardly reaching surface of the jug are vertically aligned; and a shape of the main blade substantially conforms to a shape of the jug below the area swept through by of the main blade.

12. The apparatus according to claim 1, the apparatus further including:
a relatively tight fitting polymeric lid having an upper surface and an outer edge; and
a pull tab located on the upper surface of the lid, wherein the pull tab has an at least finger-sized opening; the pull tab being located adjacent to an edge of the lid.

13. The apparatus according to claim 12, wherein:
the pull tab extends at least partially beyond an outer edge of the lid.

14. The apparatus according to claim 1, wherein each main arm is curved substantially conforming to the upwardly radially-outward reaching surface of the underlying portion.

15. The apparatus according to claim 14, wherein the cutting assembly further comprising an upper blade module having two or more minor arms that reach upwardly outwardly within the jug, the upper blade module being co-axially spaced above the main blade, wherein the area swept through by the minor arms is less than the area swept through by the main arms; and each minor arm is vertically inclined to a different degree to the main arms.

16. The apparatus according to claim 15, wherein,
a cutting edge of at least one minor arm has serrations.

17. The apparatus according to claim 16, wherein an upright blade tip is located proximal to an outer end of each main arm.

18. The apparatus according to claim 17, wherein each main arm further comprises a cutting edge that faces downwardly and into a direction of rotation.

19. The apparatus according to claim 18, wherein,
the cutting assembly is mounted on a coupling assembly that defines the underlying portion of the interior surface of the jug.

20. The apparatus according to claim 1, wherein the transition point is defined by a tangential intersection between the upwardly radially-outward reaching lower surface and the substantially straight interior side surface of the jug.

* * * * *